Oct. 23, 1945.     O. O. SUNDERLAND     2,387,691
GUN
Filed Sept. 19, 1942     6 Sheets-Sheet 3
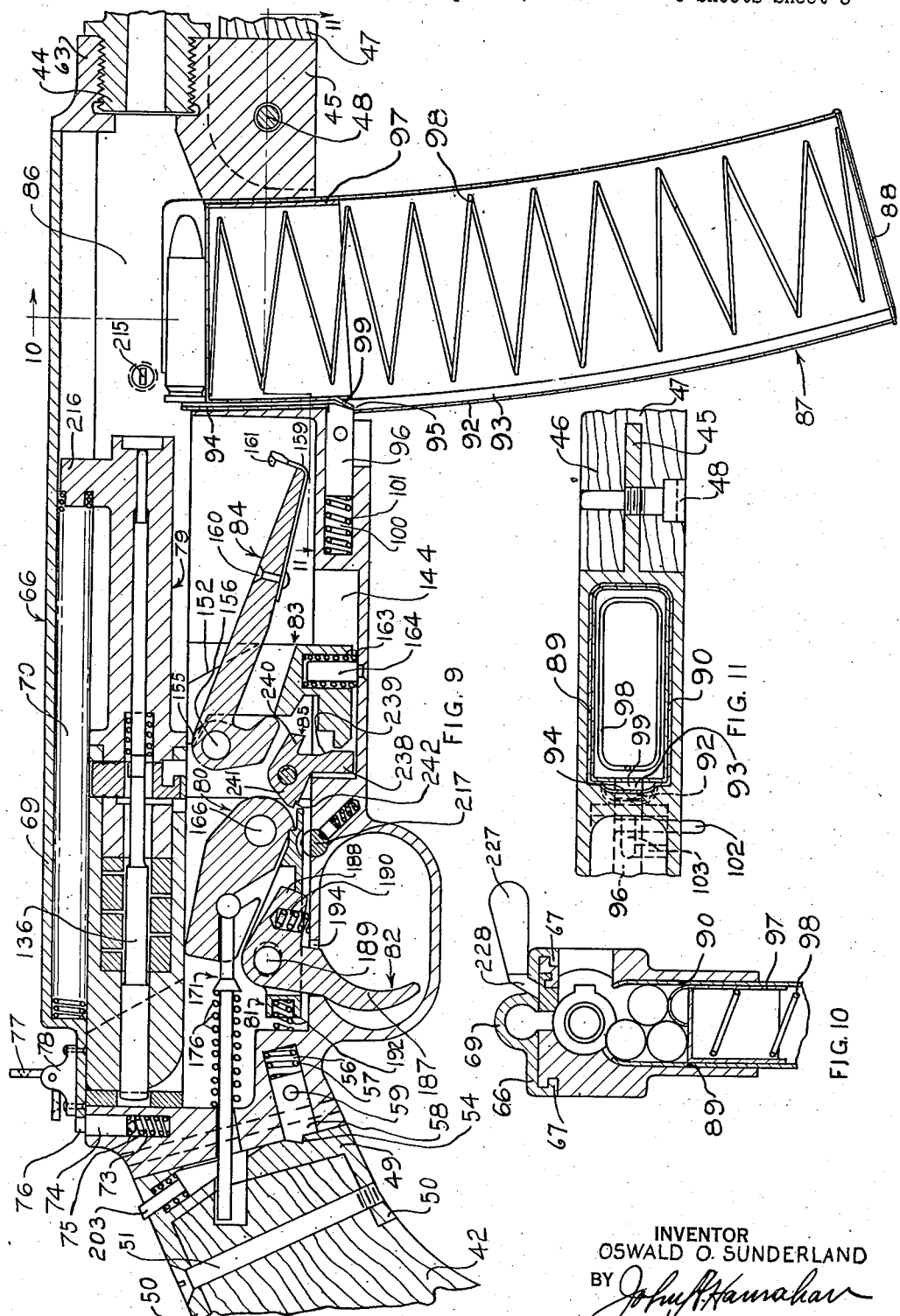
INVENTOR
OSWALD O. SUNDERLAND
BY John F. Hanrahan
ATTORNEY Oct. 23, 1945.　　　　O. O. SUNDERLAND　　　　2,387,691
GUN
Filed Sept. 19, 1942　　　　6 Sheets-Sheet 4
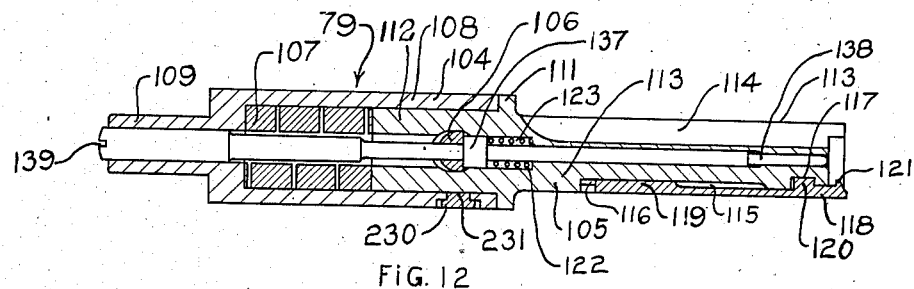
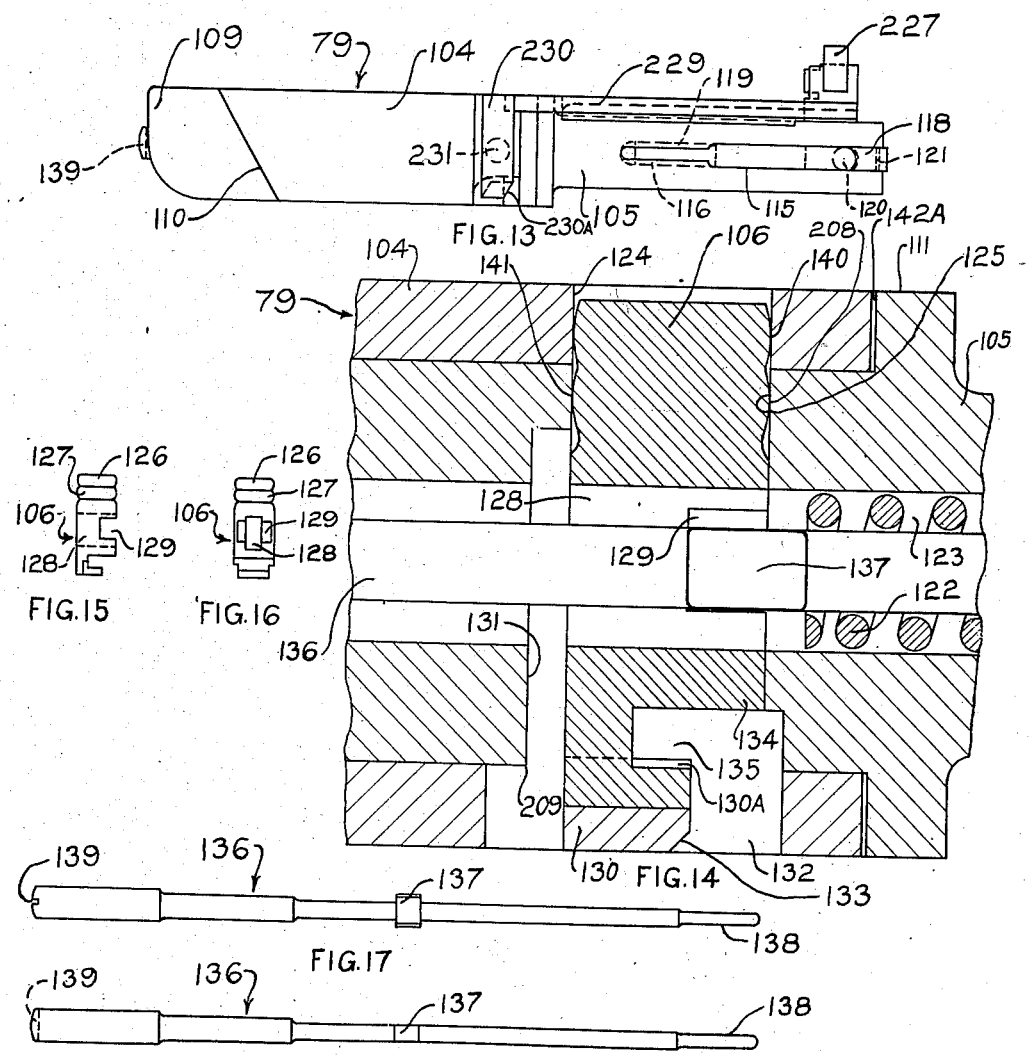
INVENTOR
OSWALD O. SUNDERLAND
BY John F. Hanrahan
ATTORNEY

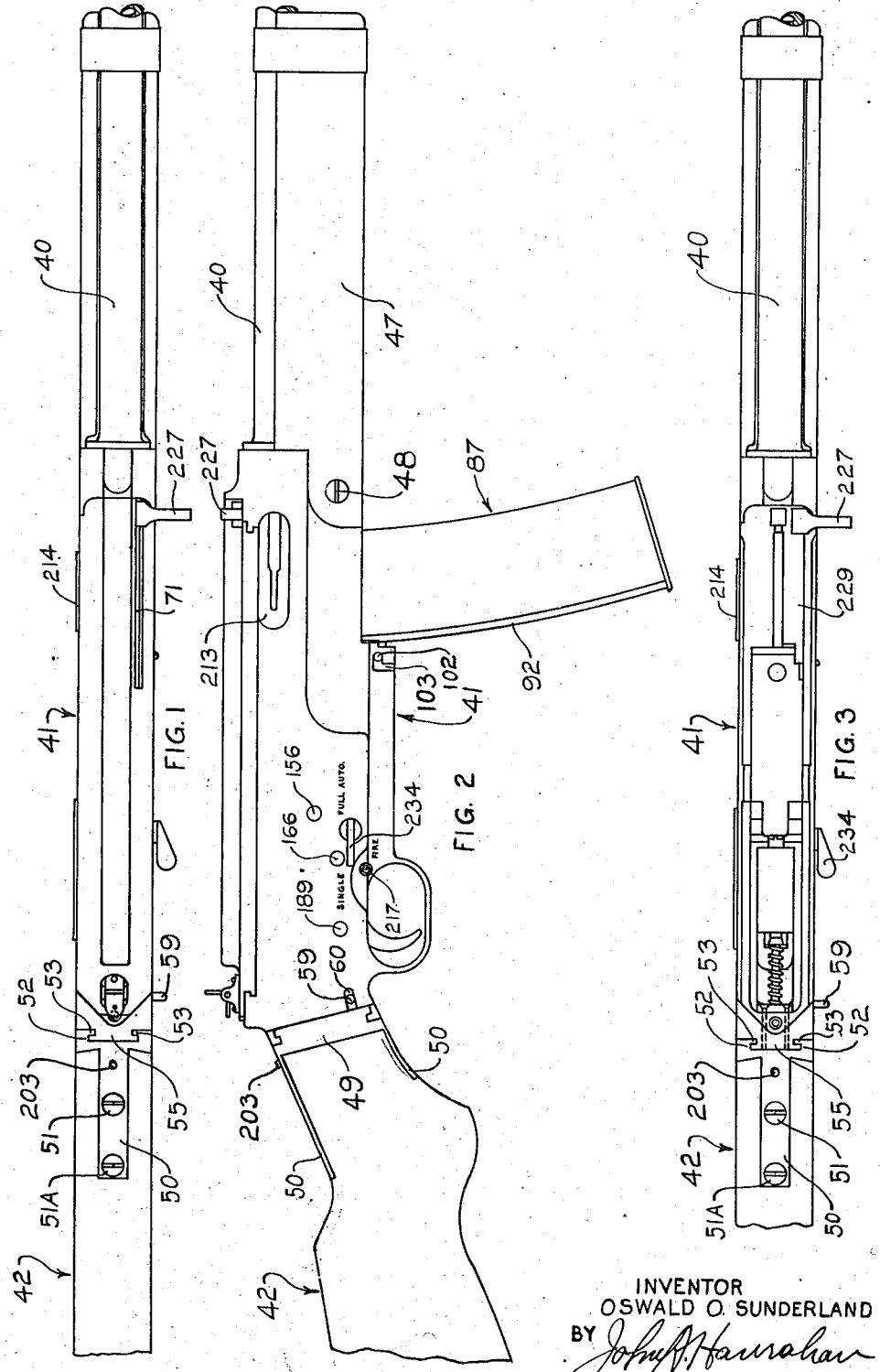

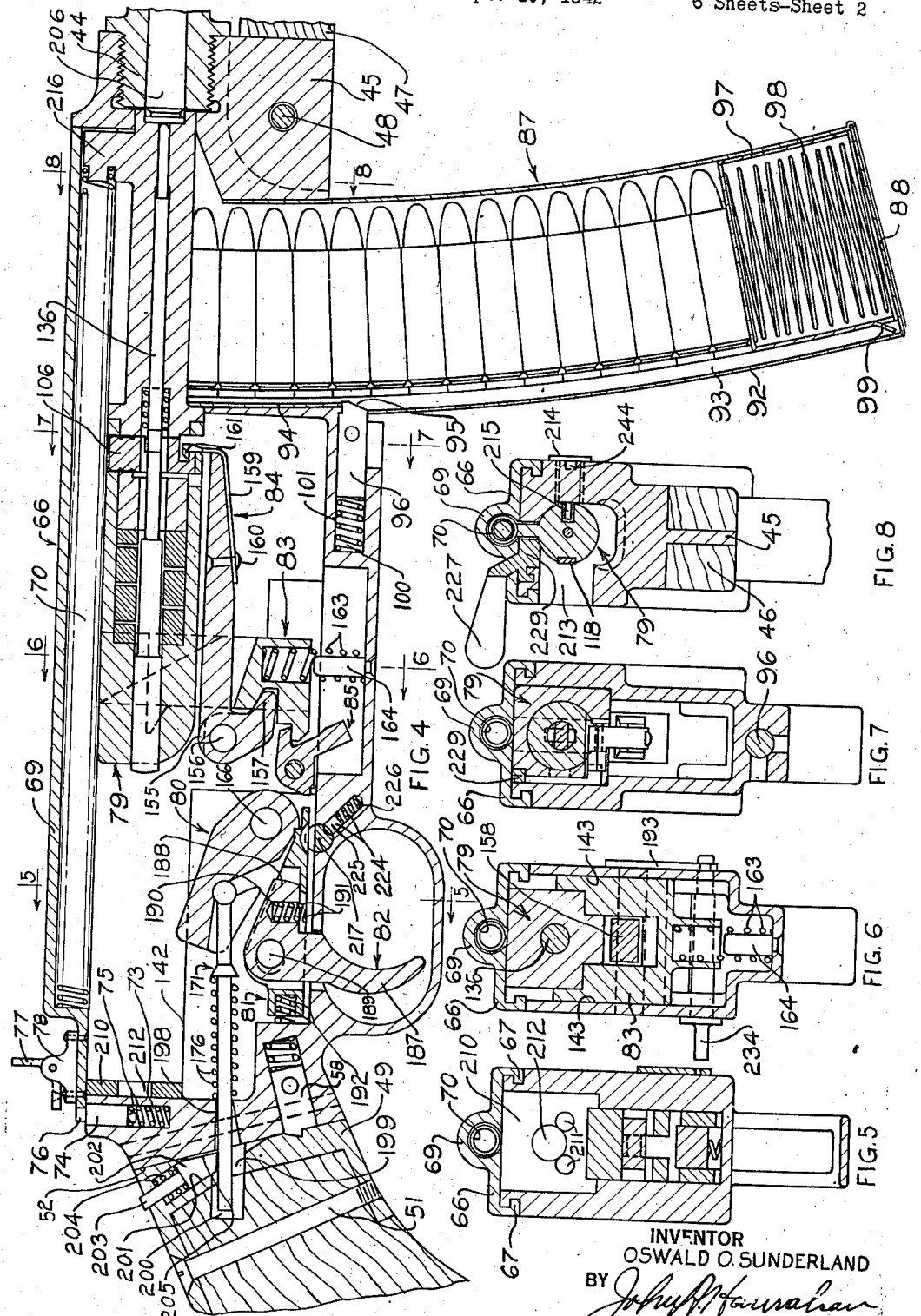

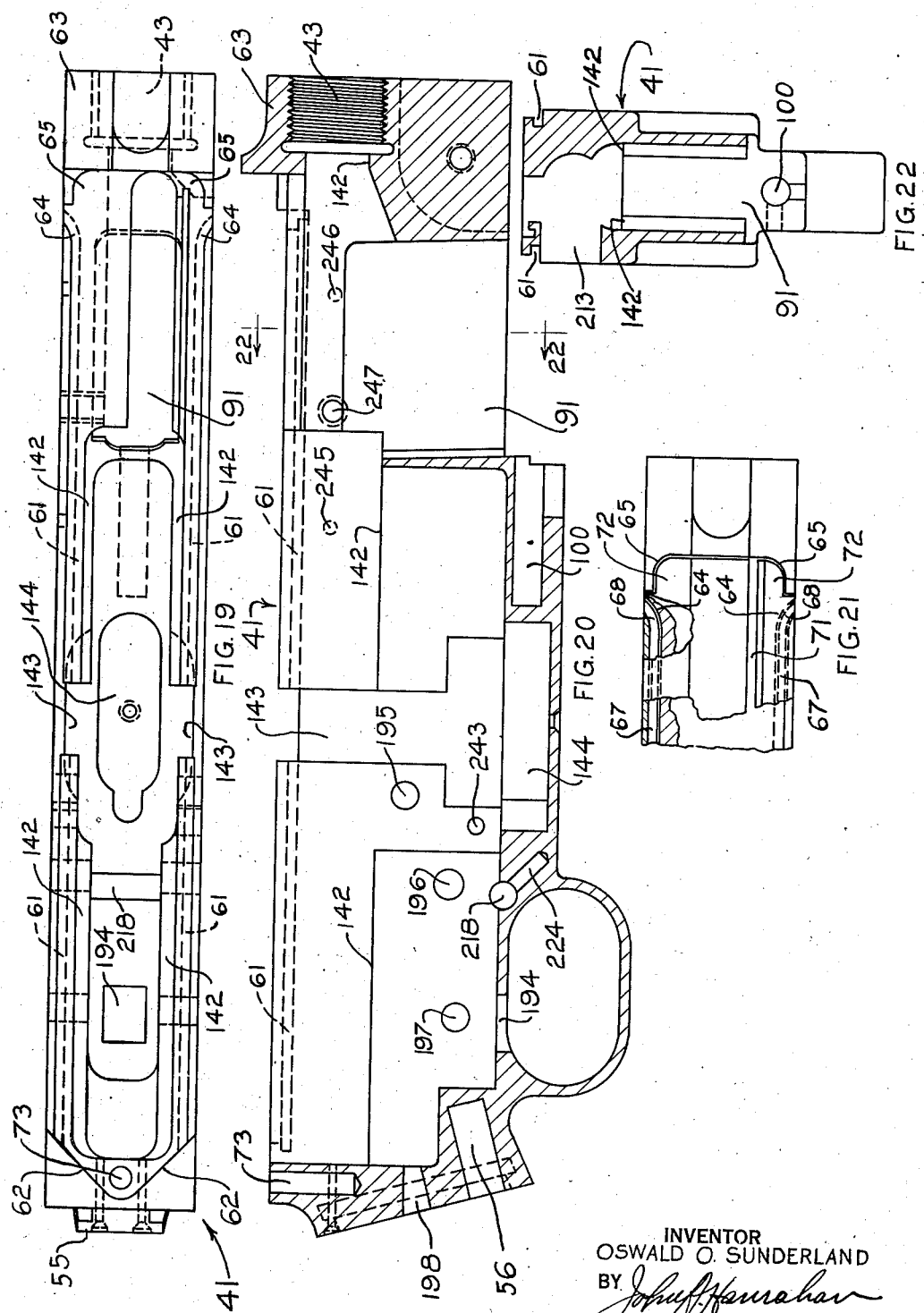

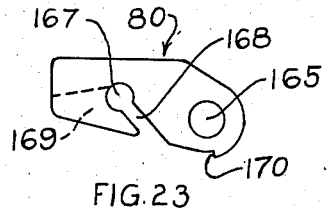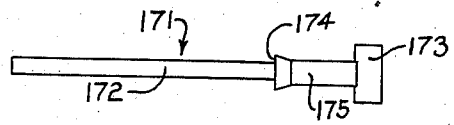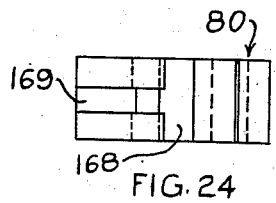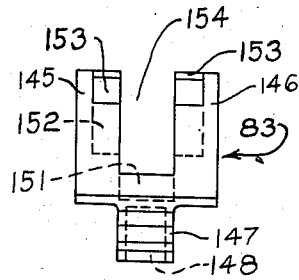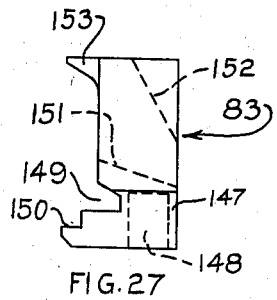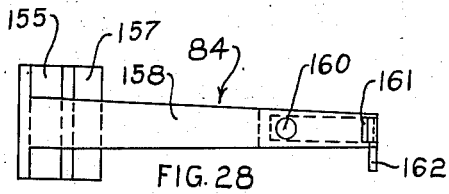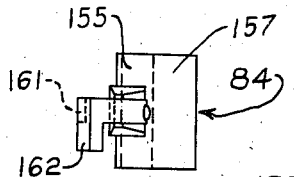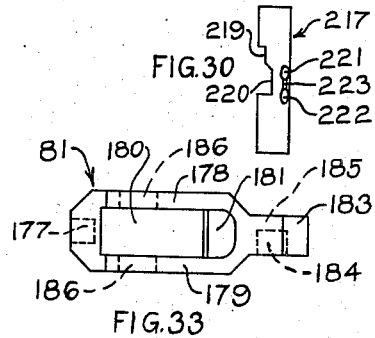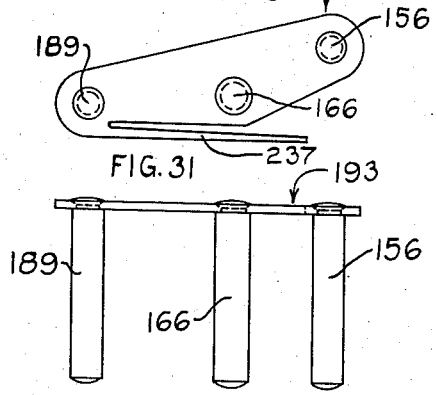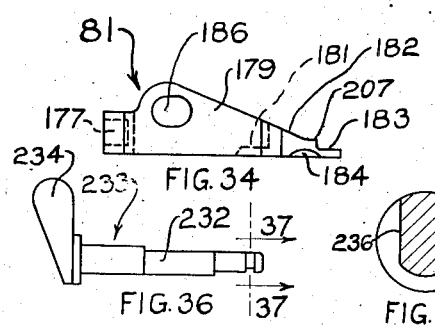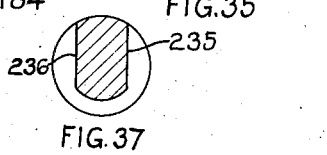

Patented Oct. 23, 1945

2,387,691

UNITED STATES PATENT OFFICE 2,387,691

GUN

Oswald O. Sunderland, Fairfield, Conn.

Application September 19, 1942, Serial No. 458,932

11 Claims. (Cl. 42—3)

This invention relates to new and useful improvements in guns and has particular relation to a gun which may be used as a fully or semi automatic weapon, as elected by the operator, only a slight manipulation being required to convert the gun from one type to the other.

An object of the invention is to provide a gun in which the shell is in the firing chamber and the bolt and firing pin are forward against the the shell before the hammer is snapped whereby there is no forward movement of the bolt or other part (with the exception of the hammer) after the gun is sighted and the trigger pulled, all in a gun that may be used as a fully or semi automatic gun as desired.

Another object is to provide a lighter and more compact but yet sturdy gun having the above described characteristics.

A further object is to provide a gun including a delaying means, comprising a pressure operated release catch, that takes the initial shock of the firing explosion whereby there is no need for a heavy bolt or a heavy recoil spring.

Yet another object is to provide in a gun having the characteristics of the immediately preceding paragraph a manual which includes means to release the catch or lock lever to permit of manual retraction of the bolt.

A further object of the invention is to provide in a gun of the type indicated an improved cartridge clip and means to secure the same on a gun in such manner that when the last shell of the clip is used the clip is automatically disconnected from the gun.

Another object is to provide an improved construction and assembly of bolt and firing pin for use in a gun of the character indicated.

Other objects and advantages will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a top plan view of the gun of the invention, portions of the barrel and stock being broken away;

Fig. 2 is a side elevational view of the gun as shown in Fig. 1;

Fig. 3 is a view similar to Fig. 1 but with the frame cover piece removed;

Fig. 4 is a sectional view on a larger scale through the frame portion of the gun;

Fig. 5 is a transverse sectional view taken as along the plane of the line 5—5 of Fig. 4;

Fig. 6 is a sectional view taken as along the plane of the line 6—6 of Fig. 4;

Fig. 7 is a sectional view taken as along the plane of the line 7—7 of Fig. 4;

Fig. 8 is a sectional view taken as along the plane of the line 8—8 of Fig. 4;

Fig. 9 is a view somewhat similar to Fig. 4 but with the bolt back and the other parts positioned accordingly and with the clip nearly empty;

Fig. 10 is a detail sectional view taken as along the plane of the line 10 of Fig. 9;

Fig. 11 is a horizontal sectional view taken as along the plane of the line 11—11 of Fig. 9;

Fig. 12 is a horizontal sectional view through the gun bolt;

Fig. 13 is a side elevational view of the gun bolt.

Fig. 14 is an enlarged sectional view through the articulated connection between the bolt parts;

Fig. 15 is a side elevational view of the pin used to connect the bolt parts and to cooperate with a latch means as will later appear;

Fig. 16 is an elevational view of the said pin but at right angles to Fig. 15;

Fig. 17 is a top plan view of the firing pin of the gun;

Fig. 18 is a side elevational view of said pin;

Fig. 19 is a top plan view of the gun frame alone;

Fig. 20 is a central longitudinal sectional view of said frame;

Fig. 21 is a view partly in top plan and partly in section and showing the manner in which the forward part of the frame cover fits into the frame;

Fig. 22 is a sectional view taken as along the line 22—22 of Fig. 20;

Fig. 23 is a side elevational view of the gun hammer alone;

Fig. 24 is a bottom plan view of such hammer;

Fig. 25 is a top plan view of the hammer rod alone;

Fig. 26 is a rear elevational view of the gun lock alone;

Fig. 27 is a side elevational view of the same;

Fig. 28 is a top plan view of the lock lever assembly;

Fig. 29 is an end view of the part of Fig. 28, the view being taken looking from the right in Fig. 28;

Fig. 30 is an elevational view of the safety lock pin;

Fig. 31 is a side elevational view of the pivot plate of the gun;

Fig. 32 is a top plan view of such pivot plate;

Fig. 33 is a top plan view of the sear of the gun;

Fig. 34 is a side elevational view of the sear;

Fig. 35 is an end elevational view of the same the view being taken looking from the right in Fig. 34;

Fig. 36 is a side elevational view of a rocker pivot or shaft of the gun; and

Fig. 37 is an enlarged detail sectional view taken as along the line 37—37 of Fig. 36.

Referring in detail to the drawings the gun of the invention is herein disclosed as embodied in a shoulder rifle adapted for military use. The gun comprises a barrel 40 which may be of the usual construction, a frame 41 mounting the operating parts of the gun, and a stock 42. A cartridge clip is shown associated with the gun and the construction and functioning of this clip and of the other parts now to be described will be made clear.

At its outer or forward end the frame 41 (shown alone in Figs. 19, 20 and 22) has a threaded bore 43 into which is threaded the reduced rear or breech portion 44 of the barrel 40 as best shown in Figs. 4 and 9. Below the frame portion containing the mentioned threaded bore is a rib 45 straddled by the inner or rear portion 46 of a hand guard 47 located at the under side of the barrel 40. A screw 48 passes through the bifurcated end portion 46 of the hand guard and through the rib 45 and (see Fig. 11) is threaded only in the metal rib.

A plate 49 on the forward end of the stock 42 includes strap like upper and lower extensions 50 disposed against the upper and lower edges of the stock and a screw 51 passes through such extensions and the stock and secures the plate to the latter. The upper extension 50 is somewhat longer than the lower extension and a second screw, a wood screw 51A, passes through the upper extension and into the stock 42. Plate 49 is used in securing the stock 42 to the frame 41 and to such end is provided in its forward face with a vertically extending groove 52 undercut to provide beads 53 at opposite sides of its entrance. Groove 52 tapers laterally whereby it is wider toward its lower end. In the inner wall of said groove toward the lower end thereof the plate 49 is provided with a notch 54 which, in the assembled gun, cooperates with a spring pressed catch as will appear.

At its rear end the frame 41 is provided with a rib 55 undercut in its sides flush with the rear end of the frame whereby it is laterally grooved as shown best in Figs. 1 and 3. This rib 55 tapers laterally whereby it is widest toward its lower end. In its lower rear portion frame 41 is provided with a socket 56 opening through the rear side of the rib 55 and within said socket is a coil spring 57 constantly urging a catch 58 into a projected position. A laterally extending pin 59 rigid with the catch 58 projects from the side of the frame 41 (see Fig. 2) and passes through a slot 60. With this arrangement it will be clear that the pin 59 may be manually operated to retract the catch 58.

In assembling the stock and frame the parts are moved relatively in a vertical plane as the gun is viewed in Fig. 2. That is, the parts are arranged with the rib 55 of the frame aligned with the groove 52 of the stock plate 49 and then either or both of said parts are moved to locate the rib in such groove. As the rib and the groove are both tapered the rib is snugly received in the groove and the beads at the sides of the front entrance to the groove are received in the grooves at the sides of the rib.

Catch 58 is normally projecting and as the parts are moved together the upper forward edge of the catch is engaged but being bevelled as shown is cammed back into socket 56 until the notch 54 comes opposite the catch (at this time the parts are assembled) and the spring 55 then projects the catch so that its forward portion enters notch 54 locking the stock and frame together. It is noted that the lower edge of the catch is at a slight angle to facilitate its entrance into notch 54 and has a slight tendency to further urge the stock and frame into proper relation. To again separate the stock and frame the pin 59 is used to withdraw the catch from notch 54 whereupon the stock and frame are separated by relative movements in the direction of the length of the rib 55 and the groove 52.

Frame 41 as herein disclosed is a one-piece construction closed at its sides and bottom edge and open at its top edge. As will appear this frame is substantially hollow and contains the operating mechanism of the gun. In its side walls adjacent its upper edge the frame is provided with longitudinally extending grooves 61 opening through the rear end of the frame where the latter is pinched in as at 62 and at the forward end of the frame but short of the extension 63 containing the threaded bore 43, curved outwardly as at 64 (see Fig. 21). In its upper side immediately in the rear of the extension 63 the frame is provided with a U-shaped recess 65.

Closing the upper open edge of the frame 41 is a cover generally designated 66. This cover straddles the upper frame edge and includes inwardly extending ribs 67 located to enter the grooves 61 when the cover is on the frame. For the most part these ribs are parallel as in the case of the grooves but toward their forward ends the ribs are curved outwardly at 68 in the manner in which the grooves 61 are curved outwardly at 64 (see Fig. 21).

Cover 66 includes a hollow raised portion 69 containing a relatively long coil spring 70 which when the gun is in use serves to move and retain a bolt as will appear. A slot 71 opens through the forward end of the cover laterally of portion 69. Such slot provides for the operation of manual means for retracting the gun bolt as will be set forth. The forward slotted end 72 of the cover is rounded or shaped to fit snugly in the U-shaped recess 65 in the top of the frame as shown in Figs. 1 and 3 and also in Fig. 21.

In this way the slotted end portion of the cover is prevented from becoming spread from the slot 71 during use of the gun. Further the outwardly curved rib portions 68 of the cover being located in the outwardly curved groove portions 64 when the cover is in place the free end 72 of the cover is prevented from being pinched in on the slot 71 during use of the gun. For free operation of the manual bolt retracting means this slot should be maintained constant and with the described construction it is maintained constant.

Rearwardly of cover 66, frame 41 is provided with a vertically disposed socket 73 in which is located a detent 74 urged to a projected position by a small coil spring 75 bearing against the inner end of the socket and secured at its outer end to said detent. When the cover is fully in place (Figs. 4 and 9) the reduced diameter end portion 76 of detent 74 projects from the frame 41 and engages the rear end of the cover preventing rearward movement thereof, thus maintaining it in position. At the same time the rear portion of the cover is over the larger diameter portion of the detent retaining the latter in position. When the cover is to be removed the detent is depressed and then the cover may simply be slid rearwardly off the frame. A rear gun site 77 is secured on the rear portion of the cover as by a bracket 78 although any other means for the stated purpose may be used.

Frame 41 contains a breech bolt generally designated 79, a hammer generally designated 80, a sear generally designated 81, a trigger generally designated 82, a lock generally designated 83, a lock lever generally designated 84 and a trip device generally designated 85. The upper forward end portion 86 of the frame I designate as a loading chamber and shells or cartridges are supplied to such chamber from a clip 87 and are moved one at a time from such chamber into the breech of the barrel 40.

Clip 87 comprises an elongated sheet metal casing closed at its sides and including a bottom wall 88. At the upper end of the clip its side walls 89 and 90 are bent or curved inwardly slightly but such upper end is open as best shown in Fig. 10. Frame 41 has an opening in its lower edge at 91 (see Fig. 22) and the clip is mounted on the gun or on the frame of the gun by inserting the upper end of the clip into the frame through the opening 91.

Edge wall 92 of the clip is provided with a vertical groove 93. An opening 95 is provided in wall 92 and while the groove 93 is shallow in the wall portion 94 above said opening it provides for clearance between the inner end of a latch 96 (to be described) and the butt ends of cartridges in the clip. When the upper portion of the clip is inserted into the frame through the opening 91 a latch 96 carried by the frame enters the opening 95 in the edge wall of the clip and entering under the portion 94 of said wall supports the clip in proper position. The manner in which the latch 96 is mounted will be described.

In Fig. 4 the clip is full and a comparison of such figure and Fig. 10 will show that the clip is of slightly less width than the diameter of two cartridges so that the latter are arranged in a staggered relation. A follower 97 in the lower portion of the clip is constantly urged upwardly therein by a coil spring 98. The arrangement is such that each time the bolt 79 moves forwardly from the position of Fig. 9 to that of Fig. 4 it takes the uppermost cartridge from the clip 87 and moves such cartridge into the gun breech.

On an edge of the follower 97 is a tongue 99 disposed in the groove 93 in wall portion 92. As the cartridges are taken from the upper portion of the clip the follower is raised in the clip by the spring 98. The relative sizes of the parts are such that when the last cartridge has been removed from the clip by the bolt 79 the follower is just slightly above the position in which it is shown in Fig. 9 and the tongue 99 engages the projecting portion of the latch 96 and cams the latter out of the opening 95 in the clip wall. Thereupon the clip is released and may fall from the frame 41 or if it has a snug fit in the frame may be easily pulled therefrom and a new clip inserted.

Latch 96 operates in a socket 100 in the frame and a coil spring 101 in said socket normally maintains said latch in projected position. A laterally extending pin 102 is rigid with the latch 96 and extends out of the frame through a bayonet slot 103 as best shown in Fig. 2. With this arrangement the latch may be manually retracted to release the clip 87 whenever that is desired.

Bolt 79 comprises essentially a rear part 104, a front part 105 partly telescoping into said rear part, a cross pin 106 and a heavy coil spring 107 (see Figs. 12, 13 and 14 for the bolt alone). Part 104 includes a hollow tubular portion 108 open at its forward end and the rear portion of said part is reduced in width and comprises a narrow extension 109. Bevelled surfaces 110 are provided at the rear end of the portion 108 for a purpose to be set forth.

Bolt part 105 includes a radial flange 111 of a size to abut the forward end of part 104 and rearwardly of said flange includes a portion 112 having a sliding fit in the portion 108 of part 104. Forwardly of flange 111 the part 105 includes an elongated transversely circular portion 113 having a longitudinally extending slot 114 in a side thereof to accommodate an ejector as will appear.

In its side opposite slot 114 the portion 113 has a groove or recess 115 undercut in its rear portion as at 116 and toward its forward end having a depression 117. An extractor 118 is disposed in the groove 115 and has a flanged portion 119 received in the groove portion 116 and a lug 120 received in the depression 117. In this way the extractor is mounted on the bolt for movement therewith but the forward end portion of the extractor may move laterally with respect to the bolt. Such forward end of the extractor is provided with a tooth-like portion 121 to enter the groove usually provided adjacent the end of a shell or cartridge.

When assembling bolt 79 the coil spring 107 is dropped into the part 104 and a relatively light coil spring 122 is dropped into a socket 123 in the part 105. Then portion 12 is disposed in the tubular portion of part 104 and the parts forced together against the tendency of spring 107. When transverse openings 124 and 125 in the parts 104 and 105 respectively are in register the cross pin 106 is passed into such openings.

Toward its upper end pin 106 is provided with portions 126 and 127 rounded in the direction of the length of such pin. Through pin 106 is a rectangular passage 128 and in the front face of such pin is a rectangular recess or socket 129 through the intermediate portion of which the passage 128 opens. As will be clear from Fig. 16 the longitudinal axis of the passage 128 and the socket 129 are at right angles to one another.

Movement of pin 106 downwardly through openings 124 and 125 is limited by a wall 130 of the bolt portion 108 (see Fig. 14). Adjacent the rear face of the pin 106 the bolt part 105 has its portion 112 cut away as at 131 in Fig. 14 and in the same figure it is noted that the part 108 is slotted at the inner side of wall 130 providing a groove 130A receiving the lower end portion of pin 106 to prevent the latter turning about its own longitudinal axis. An opening 132 is provided through bolt portion 108 forwardly of its wall portion 130 and such wall portion is bevelled on its outer side at 133 leading to such opening. In line with the opening 132 the lower end of pin 106 is cut away at 134 and a recess or cavity 135 is provided in the forward face of the lower portion of the pin.

When the parts of the bolt have been assembled as described a firing pin 136 is assembled in the bolt. To receive the firing pin the bolt is provided with a longitudinally extending recess passing entirely through the bolt and of reduced diameter forwardly of the socket 123 receiving the spring 122. Firing pin 136 also varies in diameter and its forward portions have a sliding fit in the described passage through the bolt. Intermediate its ends the firing pin 136 is provided with a lug 137 in one plane extending beyond opposite sides of the pin but in the other plane being of a width equal to the diameter of the pin.

The firing pin is inserted into the assembled bolt by entering the small diameter end or firing point 138 of the pin through the rear end of the bolt with the lug 137 aligned with the passage 128 through the pin 106. When the lug is moved forwardly of the pin 106 the firing pin is rotated through ninety degrees to carry the lug 137 out of alignment with the passage 128 and into alignment with the socket 129. At such time the firing pin spring 122 is somewhat compressed and after the firing pin has been rotated as stated it is released and the spring 122 expands and forces the lug 137 of the firing pin into the socket 129 as best shown in Fig. 14.

A slot 139 may be provided in the rear end of the firing pin 136 for the reception of a bit, as of a screw driver or the like, whereby the pin may be more easily turned either in assembling it in the bolt or to remove it therefrom as when the bolt is to be disassembled for cleaning or repair or replacement of parts. From Fig. 12 it will be noted that normally the spring 122 maintains the firing pin in a retracted position with its point 138 within or flush with the forward end of the bolt 79.

Attention is further directed to the fact that the spring 107 maintains the parts 104 and 105 with the portion 140 of the former against the forward side of the curved portion 126 of pin 106 and with the portion 141 of the latter against the rear side of the curved or rounded portion 127 of said cross pin. In this connection it will be observed in Fig. 14 that normally the radial flange of part 105 is spaced slightly from the forward open end of the tubular portion 108 of the part 104. This space or clearance indicated at 142A has a purpose as will appear.

In the assembled gun the bolt 79 is disposed in the upper portion of the frame 41 and is slidable back and forth therein between a retracted position as shown in Fig. 9 and a breech closing position as shown in Fig. 4. The bolt fits between the side walls of the frame and on shoulders 142 provided on the inner sides of the frame walls and is held against upward movement by the cover 66. Intermediate the frame ends the side walls thereof are hollowed out internally interrupting the shoulders 142 but providing vertical channels 143 opposite one another in said walls. (See Figs. 19 and 20.) In the bottom wall of the frame between said channels 143 is a well or recess 144.

Lock 83 (see Figs. 26 and 27 for the lock alone) comprises a body including a bifurcated portion providing a pair of upstanding arms 145 and 146 and a depending portion 147 having a socket 148 opening through its lower end and having a notch 149 in its rear side and a step portion 150 below said notch. The lock body between its arms 145 and 146 is bevelled as at 151 and the forward faces of said arms are provided with bevels 152 although it is noted that the latter do not extend to the outer side edges of the arms and do extend to the inner side edges thereof and also to the upper ends thereof. In addition to the above each of the arms 145 and 146 at its upper rear side carries a lug or projection 153. Here it is noted that the mentioned arms of the lock are spaced apart so that the space 154 between them is of the width of the narrow portion 109 of the bolt 79.

The lock lever 84 cooperates with the lock 83 and the bolt 79 and such lock lever (for the lock lever alone see Figs. 28 and 29) comprises a hub portion 155 pivotally mounted on a pin 156 supported by the side walls of frame 41. A short arm or toe 157 depends from said hub 155 and a rather long arm 158 is likewise integral with said hub. Portion 157 is shaped to be received in the notch 149 of the lock 83 while the arm 158 extends forwardly in the frame 41. A resilient leaf spring element 159 is secured to the underside of the forward portion of arm 158 as by a rivet or the like 160 and such element passes upwardly about the forward free end of said arm and at the upper side thereof is provided with or bent to provide a hook-like portion 161. A lug 162 is integral with the element 159 and projects laterally thereof for a purpose to be set forth.

In the assembled gun (see Figs. 4 and 9) the hub 155 of the lock lever is located rearwardly of the lock 83 and the long arm 158 of such lever extends forwardly between the arms 145 and 146 of the lock. A coil spring 163 having an end portion disposed about a guide pin 164 and having its upper portion in the socket 148 normally maintains the lock 83 in the elevated position of Fig. 4 but is adapted to permit of the lock being forced downwardly to the position of Fig. 9.

Hammer 80 (shown alone in Figs. 23 and 24) comprises a body or block of metal having an opening 165 therethrough toward one end thereof for the passage of a pivot 166 for mounting the hammer. In spaced relation to said opening the hammer has a bearing recess 167 communicating with the lower side of the hammer through a slot 168 arranged parallel with the pivot opening 165. A slot 169 at right angles to the pivot opening passes through the lower side of the hammer and the end thereof remote from said pivot opening and in addition enters the slot 168. At the under side of the hammer below the pivot opening 165 thereof is a shoulder 170 adapted to be engaged by a sear for securing the hammer in cocked position.

Associated with the hammer 80 is a hammer rod generally designated 171 (shown alone in plan view in Fig. 25) comprising an elongated rod or body 172 provided at its forward end with a T-like head 173 and inwardly of said head with a shoulder or portion 174 of increased size. Hammer rod 171 is assembled with the hammer 80 by aligning an end of the head 173 with the bearing recess 167 and the shank portion 175 with the slot 168 and then moving the parts relatively laterally to dispose the head 173 in the bearing opening or passage 167 and the shank part 175 in alignment with the slot 169 and then swinging the hammer rod with its head 173 as a pivot to dispose rod portion 175 at the inner or top portion of the slot 169. A coil spring 176 is assembled on the hammer rod and the manner in which the hammer and hammer rod are assembled in the gun frame 41 will later be fully set forth.

The sear 81 (shown alone in Figs. 33, 34 and 35) is located below the hammer 80. This sear comprises an elongated metal body having a socket 177 opening through its rear wall. The body of the sear is hollowed out whereby it includes a pair of spaced walls 178 and 179 at each side of a recess or space 180 the forward portion of the lower side of which is closed by a bottom wall portion 181. A projection or extension 182 on the forward end of the sear provides a flat plate like portion 183 and inwardly of such portion and at the under side of the sear the said extension is provided with a recess 184 extending but part way across the said extension to leave a wall portion 185. The walls 178 and 179 of the sear are provided with oppositely located somewhat elongated openings 186.

Trigger 82 comprises a substantially L-shaped piece including the portion 187 to be engaged by the finger of the operator and a head-like portion 188 of a width to be received between the walls 178 and 179 of the sear. Through its body the trigger is provided with an opening and in the assembly this opening is aligned with the openings 186 in the walls of the sear and a pivot pin 189 is passed through such aligned openings to mount the trigger for pivotal movement and the sear for both pivotal movement and a slight movement in the direction of its length. This latter movement is provided for by the elongated openings 186 in the walls of the sear. In the under side of the head-like portion 188 of the trigger is a socket 190 partly receiving a small coil spring 191 when the trigger is assembled in the gun frame. A somewhat similar spring 192 enters the socket 177 of the sear in the assembled position of the latter.

The pivots 156, 166 and 189 are all carried by a pivot plate 193 located at the outer side of the frame 41. In assembling the parts in the said frame it will be understood that the sub-assemblies of the bolt and the hammer and hammer rod are completed outside of the frame. The sear is inserted into the frame with the trigger the finger portion 187 of the latter passing through an opening 194 in the lower wall of the frame. Next the hammer is lowered into place and then the lock 83 and the lock lever 84. The pivot plate is applied by moving it sidewise to insert its pivots 156, 166 and 189 through the aligned pairs of holes 195, 196 and 197 respectively provided in the side walls of the frame 41.

Hammer rod 172 passes through an opening 198 in the rear end of the frame 41 and through an aligned hole 199 in the plate 49 and into a socket 200 in the stock 42. Now spring 176 bears against shoulder 174 of the hammer rod and against the rear end of the frame about the opening 198 and constantly tends to move the hammer rod inwardly of the frame to move the hammer through a firing movement.

In the upper portion of plate 49 is a socket 201 communicating at its lower or inner end with the passage 199 through said plate. This socket may open through the bottom wall of the groove 52 in said plate and as shown in Figs. 4 and 9 is at an angle to such groove. Socket 201 opens through the upper end of plate 49 but at such upper end is of reduced diameter.

Socket 201 receives a detent 202 including a reduced diameter portion 203 adapted to project through the upper edge of the plate 49. A coil spring 204 about such reduced diameter portion is constantly urging the detent inwardly of the socket 201. The inner portion of the detent is inclined as at 205 so that the maximum the spring may move the detent inwardly is until such inclined portion of the latter engages the portion of rib 55 exposed where the socket comes through the wall of the groove 52.

Thus the spring may only move the detent inwardly sufficient to have the outer end of the same just inwardly of the upper edge of the plate 49 so that the outer end of the detent will not be contacted if the thumb is run over the upper edge of such plate. However when the hammer is in cocked position as in Figs. 4 and 9 the hammer rod 171 is in position maintaining the detent upwardly against the tendency of the spring 204.

Therefore, even in the dark the user of the gun may determine whether the hammer is in cocked position it being merely necessary to run a finger or thumb over the upper edge of the plate 49. If the detent portion 203 is exposed to be felt then the user is advised that the gun is cocked. When the hammer is forward in uncocked position the rod 171 will move forward with it and the spring 204 will move the detent into the socket 201. The detent will be again forced outwardly to tell-tale position when the hammer is next swung back to cocked position.

In using the gun as a semi-automatic firearm the operation is as follows: In Fig. 4 the gun is ready for firing and it is noted that a shell or cartridge 206 is in the firing chamber or breech of the barrel, the bolt 79 is in breech closing position and the hammer 80 is in cocked position being held there by the sear as will be explained. When the bolt 79 is in forward breech closing position the lock 83 is in its upper position with its bevelled surfaces 152 engaged by the bevelled surfaces 110 of the bolt.

Lock lever 84 has its long arm 158 in substantially horizontal position with the hook-like portion 161 of the resilient element 159 located in the notch or recess 135 in the lower forward face of the cross pin 106. In addition the toe-like portion 157 of the lock lever is located in the notch 149 of the lock. Thus the bolt 79 is locked in breech closing position since it is held by the lock 83 and the latter may not be depressed as it is secured in its upper position by the lever 84.

At this same time the sear 81 is in its rearward position with its forward portion raised and with its corner or shoulder 207 engaged with the shoulder 170 of the hammer whereby the spring 176 about such hammer rod may not force or rock the hammer forwardly about its pivot 166. The head portion 188 of the trigger is on the bottom wall portion 181 of the sear, such head portion of the trigger being held up by the trigger spring 191.

Now if the trigger is pulled its head portion 188 will be drawn downwardly and will rock the sear downwardly on pivot 189 to carry the shoulder 207 of the sear from engagement with the shoulder 170 of the hammer releasing the latter to the influence of the spring 176. Such spring snaps the hammer forwardly and the latter striking the rear end of the firing pin 136 drives the same forwardly against the tendency of spring 122 to fire the shell 206. The results on the bolt 79 will later be described.

Immediately the sear is depressed by the trigger as described and is freed of the hammer the sear spring 192 moves the sear forwardly as allowed by the elongated openings 186 in the side walls of the sear. The sear may move forwardly until its wall portion 181 moves clear of the head portion 188 of the trigger whereupon the sear will be pivoted about pivot pin 189 in a manner to raise the forward end of the sear.

The described pivoting of the sear comes about since the sear spring 192 is located below the pivot pin 189 and thus has a tendency to rock the sear in the manner indicated. With the sear tilted up as described its corner or shoulder 207 will be again in the path of movement of the shoulder 170 of the hammer and when the latter is moved back to cocked position its shoulder 170 will be engaged and held by the sear.

This is true regardless of whether the trigger has been released or is held in the position of Fig. 9. If the trigger has been released it will move from the position of Fig. 9 to that of Fig. 4 and in such instance when the hammer in its return movement engages the sear it will force it back to the position of Fig. 4 against the tendency of the sear spring 192 the hammer of spring 176 being stronger. Then the bottom wall portion 181 of the sear will again be under the trigger head portion 188 ready to be depressed to again release the hammer.

Referring back now to the time of the firing of the shell or cartridge 206. As the cartridge is fired the initial force of the explosion forces the forward bolt part 105 back toward the part 104 compressing the spring 107 an additional amount. The part 104 is being held since its shoulders 110 are against the bevelled surfaces of the lock 83 and the latter is secured in its upper position. Therefore the parts 104 and 105 have only the slight additional telescoping movement allowed by the clearance 142A. This results in a shifting of the pressure contact between part 105 and the rounded portion 127 of pin 106 from point 140 to a point 208 at the forward side of said pin.

Therefore the pin is rocked in the direction of its length as its portions 126 and 127 roll on pressure point 140 (between pin portion 126 and bolt part 104) and pressure point 208 (between pin portion 127 and bolt part 105). Thus the lower end portion of the pin 106 is shifted backward to engage the corner 209 of the bolt part 105. This releases the hook portion 161 of the element 159 from the notch 135 in the pin 106 and allows the lock lever 84 to rock slightly about its pivot 156 in a direction to have its long arm swing downwardly.

However, the movement is limited since the hook 161 merely drops onto the upper side of the wall portion 130. Now immediately the initial explosive force of the cartridge on the bolt is expended (and this is almost instantly as the bullet has left the barrel 40) the spring 107 operates to move the bolt part 105 back to normal relation to bolt part 104 and this involves a return of the pin 106 to normal relation to such parts. As the pin swings back it kicks the hook 161 off the upper side of wall portion 130 and the lock lever 84 then, being urged by the lock 83 acting on toe 157, swings about its pivot 156 to the position of Fig. 9.

This carries the toe 157 of the lock lever out of the notch 149 in the lock 83. Therefore the lock is being maintained in its upper position only by the spring 163 and the continuing expansion of the gases of the explosion against the casing of the exploded shell forcing the latter against the bolt the latter is forced back. During the backward movement of the bolt its bevelled surfaces 110 acting on the bevelled surfaces 152 on the lock cam the latter downwardly against the tendency of spring 163 so that the latter is compressed as in Fig. 9. As the bolt goes back to retracted position it rides over the hammer forcing the same back so that the shoulder 207 of the sear may be engaged with the shoulder 170 of the hammer to secure the latter in cocked position. Further the bolt rides the upper flat ends of the arms of the lock 83 maintaining the same depressed and in the extreme rearward position of the bolt it is holding the lock down by engagement with the extensions or lugs 153 on the upper ends of the arms of the lock. A cushion 210 protects the parts at the end of the rearward movement of the bolt and this cushion may be a piece of fibre or the like secured in place as with rivets 211 and having an opening 212 to accommodate the rear end of the firing pin 136.

As the bolt moves rearwardly it carries the extractor 118 with it and the latter moves the empty shell casing with it. In a side wall of the frame 41 is an elongated opening 213 and opposite such opening is an ejector 214 comprising a metal plate mounting a pin 215 projecting through the side wall of the frame and entering the groove or slot 114 in the bolt. Thus as the shell is drawn rearwardly with the bolt it is brought into engagement with the pin 215 and is caused to swing about and is ejected through the elongated opening 213 in the frame.

The coil spring 70 in the cover 66 bears at its forward end against a vertical extension 216 which extends into the spring chamber 69 of the cover. Thus when the bolt is forced rearwardly spring 70 is compressed. As the pressure is exhausted the spring 70 acts to again advance the bolt to breech closing position and as the bolt is advanced it takes the uppermost shell from the clip 87 into the breech of the barrel.

Just before the bolt reaches breech closing position the lock 83 begins to rise under the urging of spring 163 and it moves the lock lever swinging the long arm 158 of the latter upwardly. The hook 161 of the spring element 159 is sprung over the bevelled or cammed surface 133 of the wall portion 130 and moving through opening 132 enters recess 135 in pin 106. At the same time lock lever toe 157 enters notch 149 of the lock securing it in elevated position. Now the gun is again ready to fire and the bolt is in breech closing position and is secured therein by a latch means releasable by the initial pressure of the explosion of a shell.

The gun includes a safety device whereby the sear may be locked against movement by the trigger so that the gun will not be accidentally discharged. To the indicated end a pin 217 (shown alone in Fig. 30 and shown also in Figs. 4 and 9) is arranged in an opening 218 extending transversely of the frame 41 beneath the forward portion of the sear 81. While the opening 218 passes through the opposite side walls of the frame it is more in the nature of a groove in the bottom frame wall as shown in Fig. 19.

Pin 217 is cut away intermediate its ends whereby it is provided with a pair of step-like portions including the higher portion 219 and the lower portion 220. At a point spaced from the mentioned steps the pin is provided with depressions 221 and 222 connected by a groove 223. In a socket 224 in the frame 41 a plunger 225 is constantly urged against the pin 217 by a small coil spring 226. Frame 41 is recessed in its opposite sides to receive the ends of pin 217 so that the latter does not project beyond the extreme outer side surfaces of the frame.

The outer end of the plunger 225 is normally in either the depression 221 or the depression 222 securing the pin 217 against casual movement. When the pin is so positioned that its high step 219 is under the wall portion 185 of the sear the latter may not be depressed and so the hammer cannot be released and the gun will not be accidentally discharged. When the pin is shifted to bring the step 220 under the sear wall portion 185 the sear may be depressed and the gun fired in the usual manner. When the gun is on safety the plunger 225 is partly in the depression 221 and when the pin 217 is shifted the outer end of the plunger is in groove 223 during the shifting movement and then being in depression 222 makes the gun ready for firing.

When the last cartridge is taken from the clip 87 the latter is dropped from its position on the gun. Before firing such last cartridge the operator should insert another clip of cartridges. If he fails to do so the last cartridge will be fired and the bolt will move back as described and will then move forward to breech closing position on an empty breech and to a position closing the loading chamber 86 to the entrance of a cartridge.

Means are provided whereby under these circumstances the bolt may be manually retracted. Such means includes a handle or finger piece 227, a connecting part 228 passing through the slot 71 in the cover 66, a rod-like portion 229 guided by the bolt, the frame and the cover, and a latch release 230 pivoted on the bolt 79 by a lug 231 entering a recess in the side of the bolt as best shown in Figs. 12 and 13.

Part 230 is disposed in a vertical slot or groove in the side of the bolt part 104 and has its lower end disposed at the side of the laterally extending lug 162 of the resilient element 159 carrying the latch hook 161. Thus the initial movement of hand piece 227 serves to rock the part 230 on its pivot 231 to have its lower bevelled end 230A engage the lug 162 and release the hook 161 from the recess 135 in the pin 106 and cam the hook downwardly.

Latch lever 84 is then free to drop down and the bolt may be slid rearwardly in the frame 41 to cam the lock 83 out of the way and against the tendency of the coil spring 70. This is not a heavy spring and the spring 163 supporting the lock 83 is not a heavy spring. Therefore, once the lock lever is released, the bolt may be retracted by the movement of hand piece 227 without great effort. When the bolt is retracted if a new clip of cartridges has been inserted a cartridge of such clip will be moved into the gun breech by the bolt on release of the latter for movement to breech closing position.

The gun of the invention as above described is semi-automatic in its operation. The trip 85 and its mounting provide for use of a gun as a full automatic weapon. Trip 85 is mounted on the eccentric intermediate portion 232 of a shaft or pin 233 (shown alone in Fig. 36). Shaft 233 is mounted by the side walls of the frame 41 and includes a hand or finger piece 234 which in the assembly is located at the outer side of the frame at one side of the latter and an end portion partly grooved to provide oppositely located flats (see Fig. 37) 235 and 236 beyond the outer side of the frame. In the assembled gun the groove in the end of shaft 233 receives the finger like portion 237 of the pivot plate 193 whereby the latter and the shaft are both secured in place against casual displacement.

Trip 85 is a substantially T-shaped element comprising a stem 238 having a cam-like hump 239 on one side. Shaft 233 passes through the head portion of the trip and such portion includes arms 240 and 241 the latter having a notch or recess 242 adjacent its free end. Since the shaft 233 has fixed bearings in the side walls of gun frame 41, as in the openings 243, it will be understood that as the hand piece 234 is used to rock said shaft through 180 degrees the eccentric portion 232 of the shaft will be moved forwardly and rearwardly and the trip 85 being on such portion of the shaft will be shifted in like manner.

It is this shifting of the trip 85 that changes the gun from semi-automatic to full automatic and vice versa. Preferably the outer side of the frame 41 is marked as in Fig. 2 with the words "single" and "Full auto." so that in association with the position of the finger piece 234 the operator will be advised as to the position of the trip 85 within the frame and will know that the gun is set for semi or full automatic operation.

When the trip 85 is in its position toward the barrel 40 it has no part in the operation of the gun. However when it is shifted toward the stock of the gun it enters into the operation of the gun and makes the same fully automatic. With the trip shifted toward the stock (as in Fig. 9) the notch 242 of the trip is positioned over the forward flat portion 183 of the sear when the latter is moved forward by its spring 192 on the trigger being pulled. When the trigger presses the sear down to release the hammer the spring 192 moves the sear forward so that the bottom wall portion 181 of the sear clears the head portion 188 of the trigger and such head portion moves into position at the rear of said wall portion all as in Fig. 9.

Now the operator simply holds the trigger depressed and this prevents the sear being moved back by the hammer when the latter is cleared by the bolt on movement of the latter to breech closing position. However the corner 207 of the sear catches the shoulder 170 of the hammer. As the bolt approaches breech closing position the lock 83 starts up to bolt locking position and as the parts reach home the toe 150 of the lock hits the underside of the arm 240 of the T-shaped trip 85 and rocks the trip on its shaft to have the portion 242 of the trip engage portion 183 of the sear and depress the latter releasing the sear from the hammer so that the spring 176 may snap the hammer to fire the gun.

When the gun is fired the bolt comes back in the manner above described and the lock 83 is again depressed and the under side of its toe 150 engages the hump 239 on the stem portion of the trip rocking the latter back to normal position. As the bolt moves to retracted position the expended shell casing is extracted from the breech of the gun and ejected through the slot in the frame 41. Then as the bolt moves back to breech closing position it moves another shell into the gun breech and the toe 150 of the lock 83 again rocks trip 85 to depress the sear and again release the hammer.

The described operation is automatically repeated while there are cartridges left in the clip 87 and the trigger is held back or depressed to prevent such rearward movement of the sear as would carry its portion 183 from under the notched portion 242 of the trip arm 241. On turning of the shaft 233 to move the trip 85 toward the barrel 40 the automatic feature of the gun is not available and the gun is then a semi-automatic weapon. When shaft 233 is in one of the mentioned positions its flat 235 is against the pivot plate portion 237 and when the shaft is in the other position its flat 236 is against said pivot plate portion. There is a sort of spring action of the plate portion 237 so that the operator can feel when the shaft has been turned a half turn and need not be in a position to see just what he is doing.

Ejector plate 214 in addition to the pin 215 carries a lug 244 (see Fig. 8). In the frame side wall is an opening 247 through which the ejector pin 215 passes and at opposite sides of such opening are recesses 245 and 246 each adapted to receive the ejector plate lug 244. Pin 215 is threaded into the hole 247 the latter being tapped and is then locked in position by the entrance of the lug 244 into one of the recesses 245 and 246. That is the pin is threaded home as much as possible and then the lug 244 is snapped into the most convenient of the recesses 245 and 246 it being understood that the plate 214 is of spring metal.

Having thus set forth the nature of my invention, what I claim is:

1. A bolt for a gun of the character described comprising a pair of partly telescoping parts, a heavy spring tending to separate said parts longitudinally, a cross pin locking said parts against separation by said spring, and said pin including surface portions pivotally engaging the respective parts and rockable thereon for tilting of said pin on further telescoping of said parts in opposition to said spring.

2. A bolt for a gun of the character described comprising a pair of partly telescoping parts, a transverse pin through said parts, a heavy spring tending to prevent further telescoping of said parts and prevented from separating them by said pin, and said pin including surface portions rounded in the direction of the length of said pin and engaging the respective parts and movable thereon for tilting of the pin on further telescoping of said parts.

3. A bolt for a gun of the character described comprising a pair of partly telescoping parts, shoulders on said parts and positively limiting their telescoping movement, a cross pin through said parts, a spring tending to separate said parts and forcing them against opposite sides of the upper portion of said pin and normally maintaining said shoulders slightly spaced, said parts relieved at the inner side of the lower portion of said pin, and said pin having surfaces on its upper portion pivotally engaged by said parts whereby the pin rocks on said parts and moves to a tilted position as said parts are further telescoped and prior to engagement of said shoulders.

4. A bolt for a gun of the character described comprising a pair of partly telescoping parts, shoulders on said parts and positively limiting their telescoping movement, a cross pin through said parts, a spring tending to separate said parts and forcing them against opposite sides of the upper portion of said pin and normally maintaining said shoulders slightly spaced, said parts relieved at the inner side of the lower portion of the pin, and said pin on its upper portion having surfaces rounded in the direction of the length of the pin and engaged by said parts whereby said portions are movable on said parts to cause tilting of the pin as said parts are further telescoped and prior to engagement of said shoulders.

5. A bolt for a gun of the character described comprising a pair of partly telescoping parts, a cross pin extending transversely of said bolt and securing said parts together, a firing pin in and movable longitudinally through said bolt, a coil spring in said bolt and normally retaining said firing pin in retracted position, said firing pin passing through said cross pin and securing it in position, and said firing pin and cross pin including cooperating parts limiting retracting movement of said firing pin by said spring.

6. A bolt for a gun of the character described comprising a pair of partly telescoping parts, a cross pin extending transversely of said bolt and preventing separation of said parts, a spring constantly tending to separate said parts and causing portions of the latter to press against opposite sides of said pin, a firing pin extending longitudinally of said bolt and transversely through said cross pin, said cross pin having an unsymmetrical recess in its forward face, an unsymmetrical lug on said firing pin, a coil spring in said bolt about said firing pin and normally maintaining the latter in retracted position with its lug entering said recess, and said cross pin having an unsymmetrical passage therethrough at right angles to said recess whereby the firing pin is assembled in the bolt by passing its portion including said lug through said passage in the cross pin and then rotating the firing pin through its longitudinal axis to align its lug with said recess whereupon said coil spring shifts the firing pin to dispose its lug partly in said recess.

7. In a gun, a barrel, a frame at the rear of said barrel and including a loading chamber in its forward portion, a bolt in said chamber and having a forward breech closing position, a bevelled surface on said bolt, a locking element movable to and from locking relation with said bolt, said element having a bevelled surface engaged with the bevelled surface of the bolt when the element is in locking relation with the bolt and the latter is in breech closing position, said bolt including forward and rearward parts, a spring retaining said parts against casual relative movement, said bolt bevel located on the rearward of said parts, a latch securing said locking element against movement and in locking relation to the bolt when the latter is in breech closing position, said bolt when in breech closing position maintaining said latch in position securing the locking element in locking relation to the bolt, and said bolt parts arranged to be moved relatively against the action of said spring by the force of the exploding of a shell and on such relative movement release said latch whereby to permit said bolt to cam aside the locking element and move to a position rearwardly of said loading chamber.

8. In a gun, a barrel, a frame at the rear of said barrel and including a loading chamber in its forward portion, a bolt in said chamber and having a forward breech closing position, a bevelled surface on said bolt, a locking element movable to and from locking relation with said bolt, said element having a bevelled surface engaged with the bevelled surface of the bolt when the element is in locking relation with the bolt and the latter is in breech closing position, said bolt including forward and rearward parts, a spring retaining said parts against casual relative movement, said bolt bevel located on the rearward of said parts, a latch securing said locking element against movement and in locking relation to the bolt when the latter is in breech closing position, said bolt when in breech closing position maintaining said latch in position securing the locking element in locking relation to the bolt, said bolt parts arranged to be moved relatively against the action of said spring by the force of the exploding of a shell and on such relative movement release said latch whereby to permit said bolt to cam aside the locking element and move to a position rearwardly of said loading chamber, means whereby the bolt holds said locking element in cammed aside position until the bolt is again moved forwardly to breech closing position, and spring means to then move the locking element into position with its bevelled surface in engagement with the bevelled surface of the bolt and said latch into securing relation with said lock.

9. In a gun, a barrel, a frame at the rear of said barrel and including a loading chamber in its forward portion, a bolt in said chamber and having a forward breech closing position, a bevelled surface on said bolt, a locking element movable to and from locking relation with said bolt, said element having a bevelled surface engaged with the bevelled surface of the bolt when the element is in locking relation with the bolt and the latter is in breech closing position, said bolt including forward and rearward parts, a spring retaining said parts against casual relative movement, said bolt bevel located on the rearward of said parts, a latch securing said locking element against movement and in locking relation to the bolt when the latter is in breech closing position, said bolt when in breech closing position maintaining said latch in position securing the locking element in locking relation to the bolt, said bolt parts arranged to be moved relatively against the action of said spring by the force of the exploding of a shell and on such relative movement release said latch whereby to permit said bolt to cam aside the locking element and move to a position rearwardly of said loading chamber, means whereby the bolt holds said locking element in cammed aside position until the bolt is again moved forwardly to breech closing position, spring means to then move said locking element to position its bevelled surface against the bevelled surface of the bolt and means on said locking element operative to move said latch to securing relation to said locking element as the latter is moved by said spring means.

10. In a gun, a barrel, a frame in the rear of said barrel and including a loading chamber communicating with the barrel, a bolt in said frame and having a retracted position rearwardly of said loading chamber and a forward breech closing position, said bolt including forward and rearward parts, a spring retaining said parts against casual relative movement, bevelled surfaces on the opposite sides of the rearward part of said bolt, said rearward part of the bolt including a narrow part extending rearwardly from said bevelled surfaces, a lock including a pair of arms located one at each side of said narrow bolt portion while the bolt is in breech closing position, a bevel on each of said arms and engaging the bevels of the bolt part when the bolt is in breech closing position, a latch securing said lock in such position, and said parts adapted to be moved relatively on compression of said spring by the force of the firing of a shell and on such relative movement release said latch to permit the bolt to cam the lock downwardly in the frame and then ride rearwardly over the lock to retracted position.

11. In a gun, a barrel, a frame in the rear of said barrel and including a loading chamber communicating with the barrel, a bolt in said frame and having a retracted position rearwardly of said loading chamber and a forward breech closing position, said bolt including forward and rearward parts, a spring retaining said parts against casual relative movement, bevelled surfaces on the opposite sides of the rearward part of said bolt, said rearward part of the bolt including a narrow part extending rearwardly from said bevelled surfaces, a lock including a pair of arms located one at each side of said narrow bolt portion while the bolt is in breech closing position, a bevel on each of said arms and engaging the bevels of the bolt part when the bolt is in breech closing position, a latch securing said lock in such position, said parts adapted to be moved relatively on compression of said spring by the force of the firing of the shell and on such relative movement release said latch to permit the bolt to cam the lock downwardly in the frame and then ride rearwardly over the lock to retracted position, and means to automatically return said bolt to breech closing position and said lock to position with its arms at the opposite sides of the narrow bolt portion and its bevelled surfaces against those of the bolt and said latch to lock securing position.

OSWALD O. SUNDERLAND.